United States Patent
Bond et al.

(10) Patent No.: US 9,863,644 B2
(45) Date of Patent: Jan. 9, 2018

(54) GRILLING APPARATUS

(71) Applicant: Nostalgia Products LLC, Green Bay, WI (US)

(72) Inventors: Gregg Bond, Beverly Hills, CA (US); Edward E. Boughton, III, Ventura, CA (US)

(73) Assignee: NOSTALGIA PRODUCTS LLC, Green Bay, WI (US)

( * ) Notice: Subject to any disclaimer, the term of this patent is extended or adjusted under 35 U.S.C. 154(b) by 0 days.

(21) Appl. No.: 15/432,681

(22) Filed: Feb. 14, 2017

(65) Prior Publication Data

US 2017/0276376 A1    Sep. 28, 2017

Related U.S. Application Data

(63) Continuation of application No. 15/079,656, filed on Mar. 24, 2016.

(51) Int. Cl.
| | |
|---|---|
| *A47J 37/06* | (2006.01) |
| *A47J 37/08* | (2006.01) |
| *F24C 7/10* | (2006.01) |
| *F24C 15/00* | (2006.01) |
| *A47J 27/00* | (2006.01) |
| *A47J 37/07* | (2006.01) |

(52) U.S. Cl.
CPC ............... *F24C 7/10* (2013.01); *A47J 27/002* (2013.01); *A47J 27/004* (2013.01); *A47J 37/0611* (2013.01); *A47J 37/0688* (2013.01); *A47J 37/0722* (2013.01); *A47J 37/0807* (2013.01); *F24C 15/007* (2013.01)

(58) Field of Classification Search
CPC .... A47J 37/0688; A47J 37/0722; A47J 37/08; A47J 37/0807
USPC .................................. 99/402, 393, 401, 385
See application file for complete search history.

(56) References Cited

U.S. PATENT DOCUMENTS

| | | | | |
|---|---|---|---|---|
| 1,288,881 | A * | 12/1918 | Harter | A47J 37/0688 99/390 |
| 1,450,381 | A * | 4/1923 | Mieville | A47J 37/0688 126/215 |
| 2,177,177 | A * | 10/1939 | Gough | A47J 37/08 99/393 |

(Continued)

OTHER PUBLICATIONS

Office Action in U.S. Appl. No. 15/079,656 dated Jun. 30, 2017.
Office Action in U.S. Appl. No. 15/046,275 dated Jul. 12, 2017.

*Primary Examiner* — Reginald L Alexander
(74) *Attorney, Agent, or Firm* — Blakely Sokoloff Taylor & Zafman LLP

(57) ABSTRACT

A grilling apparatus for bacon or other thinly sliced meat. The apparatus includes a base with sidewalls extending from opposite ends of the base. A pair of doors are coupled to opposite sides of the base and movable from an open position to a closed position. A pair of grill plates are removably connected to a corresponding one of the doors. A heating element extends from the base between the side walls. A removable grill is placed over the heating element between the said side walls. When the doors are in the closed position, the grill and the grill plates form an enclosed space, so that when power is supplied to the heating element, heat generated by the heating element is provided by convection to the grill and the grill plates.

4 Claims, 7 Drawing Sheets

(56) References Cited

U.S. PATENT DOCUMENTS

| | | | |
|---|---|---|---|
| 3,466,998 A * | 9/1969 | Musgrove | A47J 37/0611 99/349 |
| 3,587,445 A * | 6/1971 | Kircher | A47J 37/0688 99/281 |
| 3,685,434 A * | 8/1972 | Harrison | A47J 37/0688 99/425 |
| 3,713,379 A | 1/1973 | Gordy | |
| 4,064,797 A | 12/1977 | Forlani | |
| 4,129,067 A | 12/1978 | Reiland | |
| 4,403,540 A | 9/1983 | Erkelenz | |
| 5,782,166 A | 7/1998 | Lin | |
| 5,935,478 A | 8/1999 | Parduhn | |
| 7,779,508 B2 | 8/2010 | Hardesty | |
| 2008/0196595 A1 | 8/2008 | Krishnan et al. | |
| 2011/0095019 A1 | 4/2011 | Davies | |

* cited by examiner

GRILLING APPARATUS

FIELD OF THE INVENTION

The invention is directed to a grilling apparatus in which strips of bacon or other similar thinly sliced meat product are held between a inner grill plate and outer grill plates which are heated in order to grill the bacon or other thinly slice meat.

BACKGROUND OF THE INVENTION

Devices for grilling bacon and other meats are well known in the art, and include frying pans which may be gas or electric, microwave ovens and the like. However, such traditional cooking methods are not always entirely satisfactory since bacon and other thinly sliced meats tend to curl up using such traditional cooking techniques.

In this regard, U.S. Pat. No. 3,466,998 discloses a bacon crisper in which each of two lengthwise sides are provided with inner and outer grid plates with heating coils. The outer grid plate includes an insulated hinge cover so that the outer grid plates can be moved to an open position, with bacon placed on the inner grid plates, and then the outer grid plates are closed so that the bacon is cooked by the heat generated by the inner and outer grid plates, which also hold the bacon in place during cooking.

However, among other problems with the above-described bacon crisper is that the grid plates which includes heating elements are not removable, or at least not easily removable, and, due to the embedded heating elements, are likely difficult to clean, since heating plates, even if removed, cannot be inserted in water due to the presence of the heating coils 38 and 64, as well as insulation material 62.

BRIEF SUMMARY OF THE INVENTION

The invention is directed to a bacon or other thinly sliced meat grilling apparatus which is generally rectangular in shape, which includes a removable inner grill plate, which, when in place, is heated by heating coils. Bacon to be cooked is laid on top of the inner grill plate. The device includes two doors which are movable between an open position and a closed position, with each door including a removable outer grill plate which also functions as a cooking surface when the doors, which include the grill plates, are in a closed position. The device also includes a removable grease tray which captures grease from bacon as it is cooking, and then can be removed from the device for cleaning. As previously noted, the inner grill plate, and two outer grill plates are easily removed for cleaning purposes. The doors are spring-loaded and are released by pressing buttons on top of the device, which causes the doors to swing open when the buttons are pressed. The doors can then be manually moved back to a closed position, which causes a latch to engage the doors so as to hold the doors in a closed position.

DETAILED DESCRIPTION OF THE INVENTION

Figure 1:
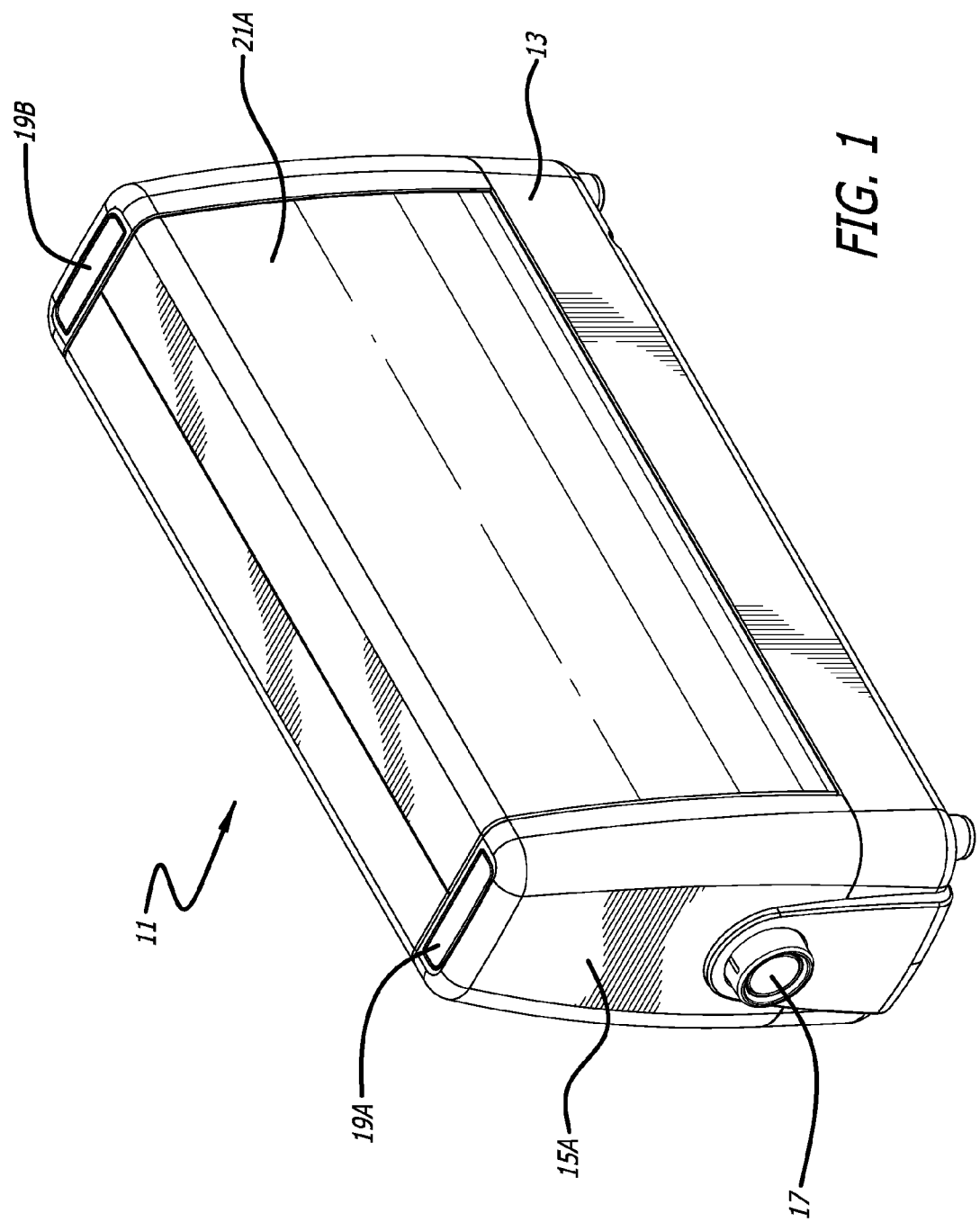
FIG. 1 is a front side perspective view showing the invented grilling apparatus with the doors in the closed position.
Figure 2:
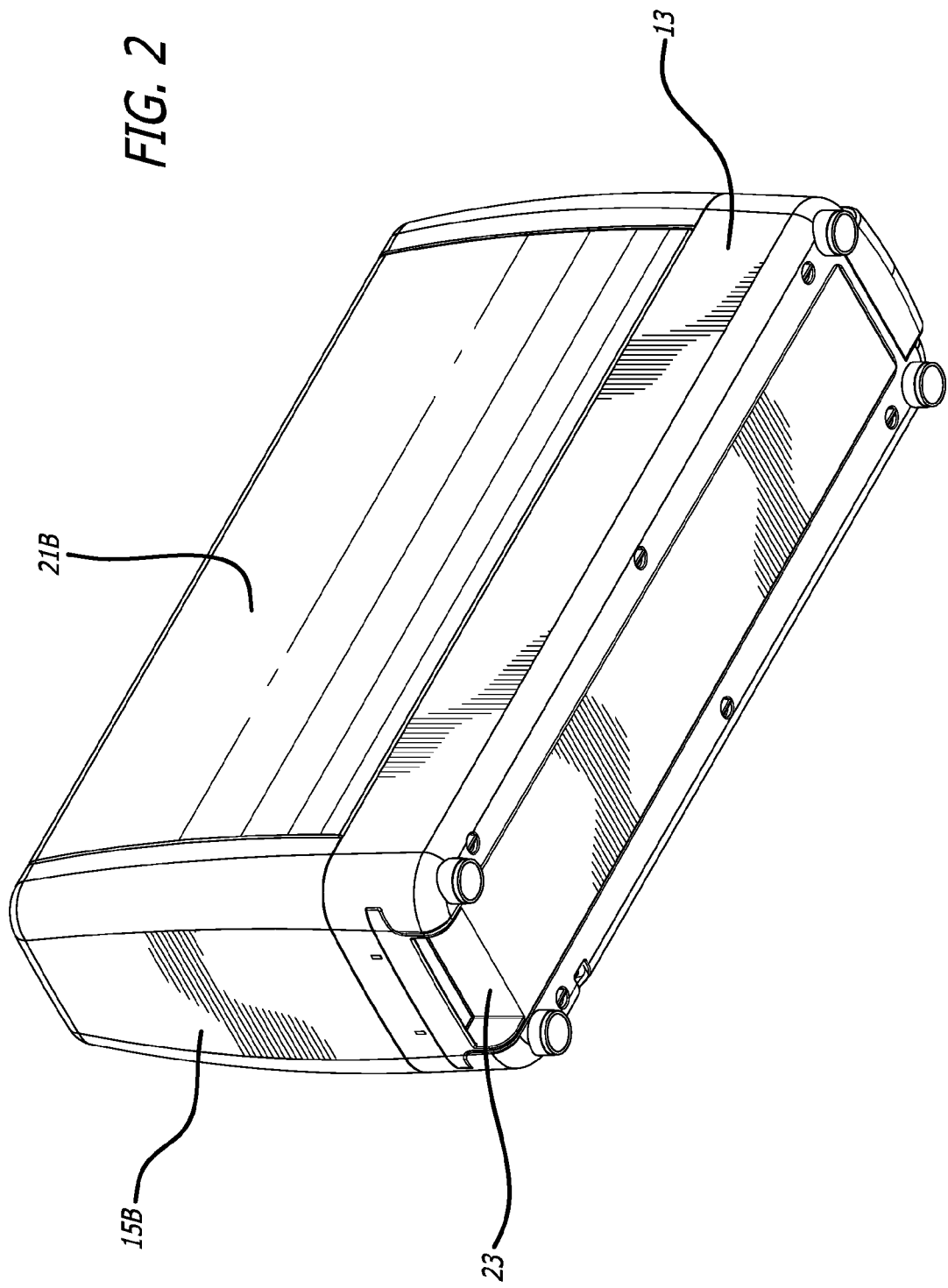
FIG. 2 is a bottom rear perspective view showing the invented grilling apparatus.
Figure 3:
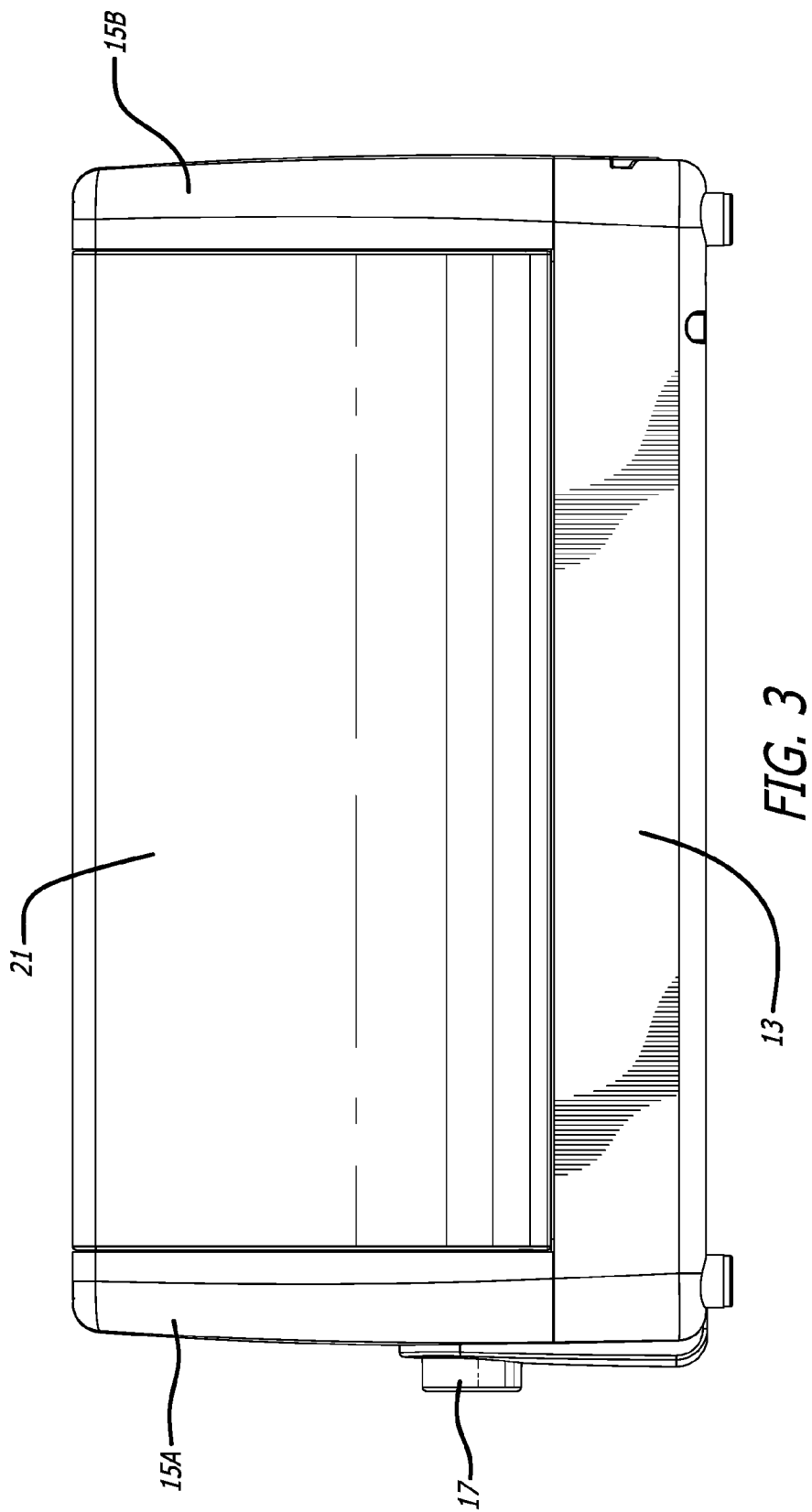
FIG. 3 is a side elevation view showing the invented grilling apparatus.

Referring first to FIGS. 1-3, the invented grilling apparatus 11 is shown. The device includes a base 13, sides 15A and 15B, heat controlling knob 17, optional door release buttons 19A and 19B, doors 21A and 21B and grease tray 23.

FIGS. 1-3 show the device with the doors in a closed position, which is the position used for grilling bacon or other thinly sliced meats. That is, as will be described in detail below, the doors are first opened, slices of bacon or other thinly sliced meats are placed on a grill surface inside the doors, and then the doors are closed. The device is turned on by operation of control knob 17, which, in one embodiment, is a timer of a type well-known in the art. That is, the knob is turned to a desired amount of cooking time, such as 5 minutes. When the specified amount of time has elapsed, the device automatically turns offs and a bell or other sound is emitted. The specifics of such a timer and bell or other sound, and how they are interconnected with each other and the other elements of the apparatus to indicate that the cooking is completed use well-known components, which, in any event, are not needed for a proper understanding of the invention.

Figure 4:
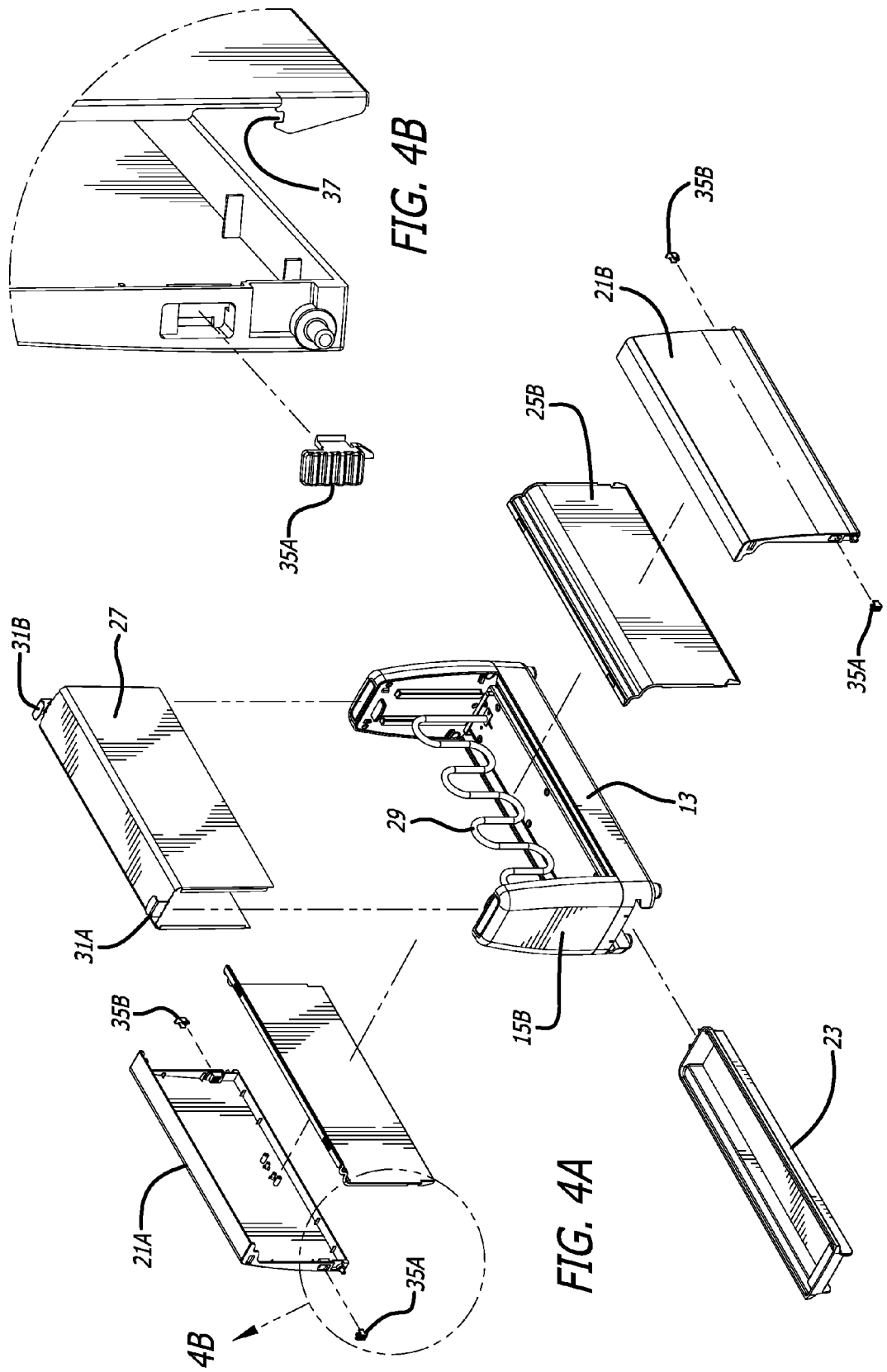
FIG. 4A is an exploded view showing the main components of the invented grilling apparatus.
FIG. 4B is a detailed view of section 4B shown in FIG. 4A.
Figure 7:
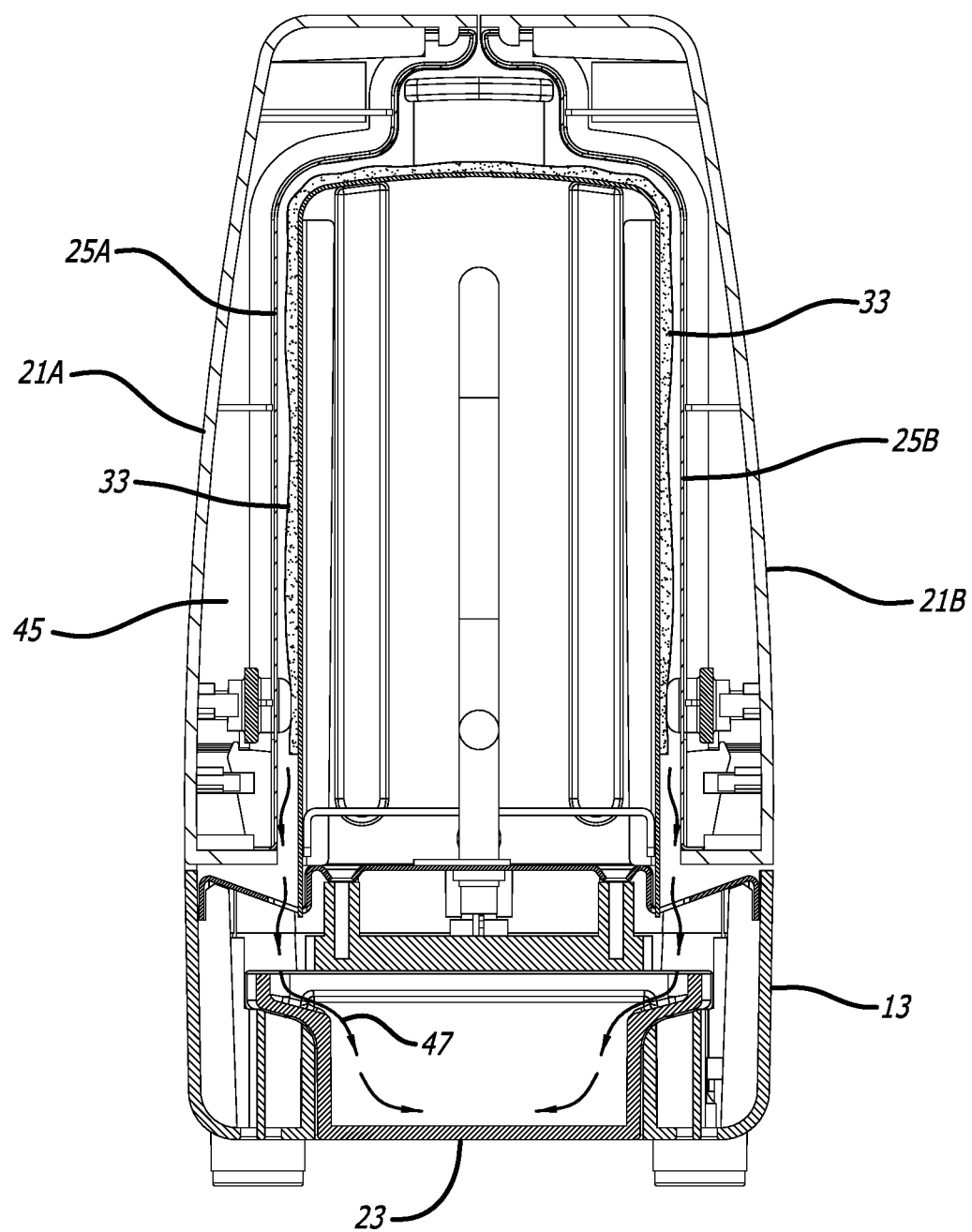
FIG. 7 is a cross-section of the invented grilling apparatus showing the two doors in a closed position.

With reference now to FIGS. 4A and 4B, the individual elements described above are shown in an exploded view, which also shows grill door plates 25A and 25B, which are removably attached to doors 21A and 21B, respectively. Also shown is grill 27, which, when mounted in place, is heated by heating element 29. Power is applied to heating element 29 to enable the heating element to generate heat as well known in the art. Grill 27 includes handles 31A and 31B, which are used to lift grill 27 up and away from base 13 for cleaning purposes. Sides 15A and 15B include channels for engaging the ends of grill 27 so that grill 27 can easily be slid into place. Base 13 also includes a channel (not shown) for engaging the bottom of grill 27. In this manner, when grill 27 is in place, the inside of the device including heating element 29 is substantially sealed from exposure to any grease produced by bacon or other meat as it is grilling, which flows into grease tray 23, as best seen in FIG. 7.

Doors 21A and 21B, include a pair of grill plate release mechanisms 35A and 35B at the side edges, which engage with corresponding structures 37 in the side edges of doors 21A and 21B, respectively. A structure corresponding to structure 37 is part of door 21B but is not shown in the drawings. The specifics of the release mechanisms 35A and 35B and 37 are not important for a proper understanding of the invention, and may be any suitable mechanism, such as spring clips or the like. In an embodiment, the release mechanism is in the nature of a switch which slides between two positions, one which locks each door to its corresponding grill plate, the other which releases the grill plate from the door so the grill plate can be removed. In use, the release mechanism on each side of a door is moved from the release/locked position to the opposite position, preferably at the same time so that the grill plate can be easily removed or locked into place. Release mechanisms 35A, 35B and 37 are constructed so as to enable grill door plates 25A and 25B to be held securely in place with doors 21A and 21B, respectively, but which enable grill door plates 25A and 25B to be easily released from doors 21A and 21B when it is desired to remove the grill plates from the doors for cleaning purposes.

In this manner, door 21A and grill door plate 25A, as well as door 21B and grill door plate 25B, each form a unitary structure in that when door 21A and 21B are opened or closed, the corresponding grill plates move in unison with the doors so that when the doors are opened, bacon or other thinly sliced meat can be placed onto grill 27, and then when the doors are closed, grill door plates 25A and 25B each press against the bacon so that heat created by heating element 29 heats by convection grill 27 along with grill door plates 25A and 25B so as to cook the bacon. Although grill 27, and grill door plates 25 and 25B do not include any heating element, each is made of a heat-conductive material so that heat created by heating element 29 heats grill 27 and grill door plates 25A and 25B substantially simultaneously since such generated heat is contained within doors 21A and 21B when they are in a closed position.

Figure 5:
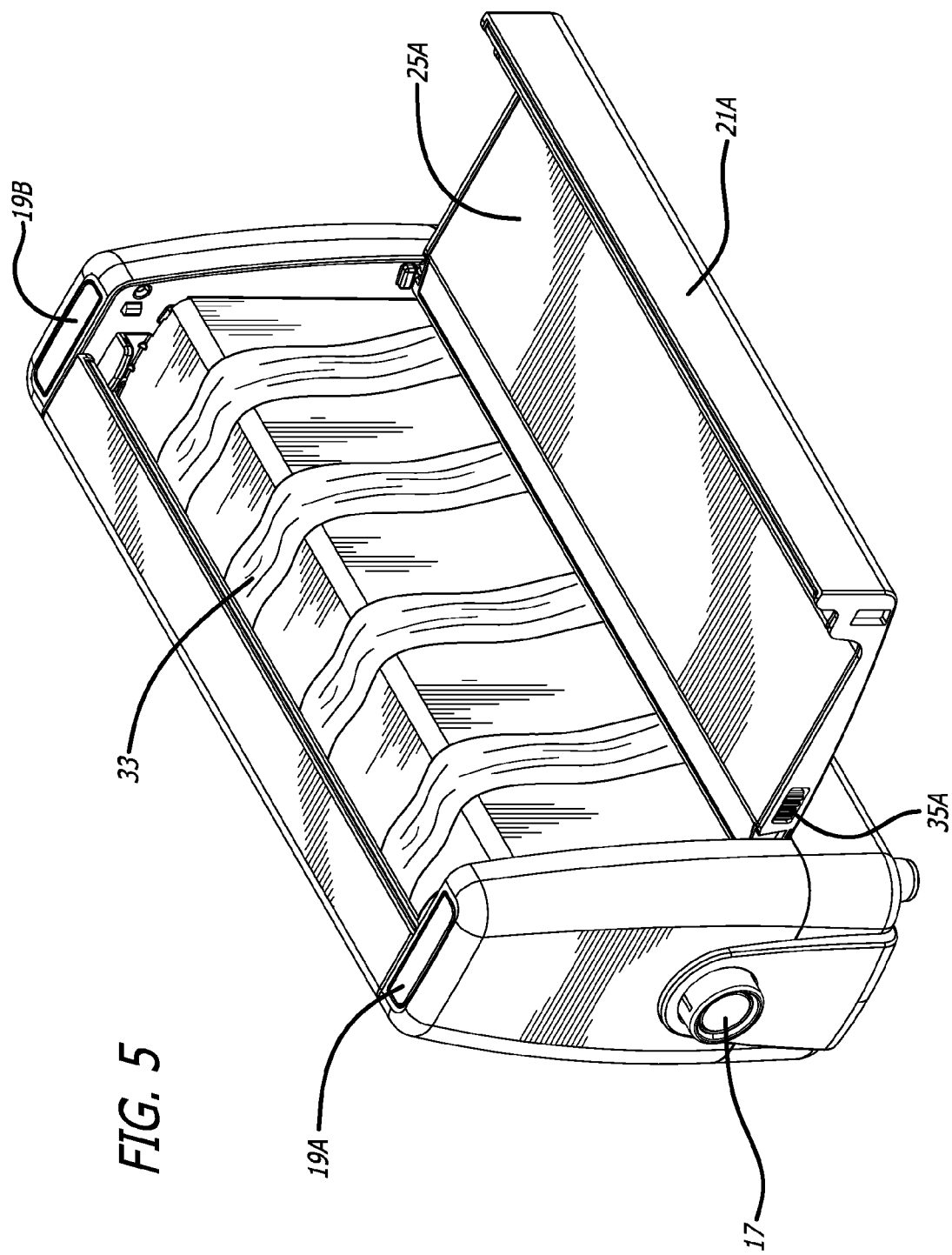
FIG. 5 is a front side perspective view showing the grilling apparatus with one door open and with several slices of bacon draped over the inner grill plate.

FIG. 5 shows the invented grilling apparatus with door 21A in an open position showing grill door plate 25A. When in use, door 21a is moved to a closed position so that bacon strips 33 are pressed between grill 27 and grill door plate 25A so that when the heating element 29 (not shown in FIG. 5) heats up, heat is transferred to grill 27 and grill door plate 25A, as well as grill door plate 26b, so that bacon strips 33 are cooked. When the cooking process is completed, door open buttons 19a and 19b are pressed in which causes doors 21A and 21B to open. In an alternate embodiment, rather than door open buttons 19a and 19b, each door may include a handle which is used to open the doors.

Figure 6:
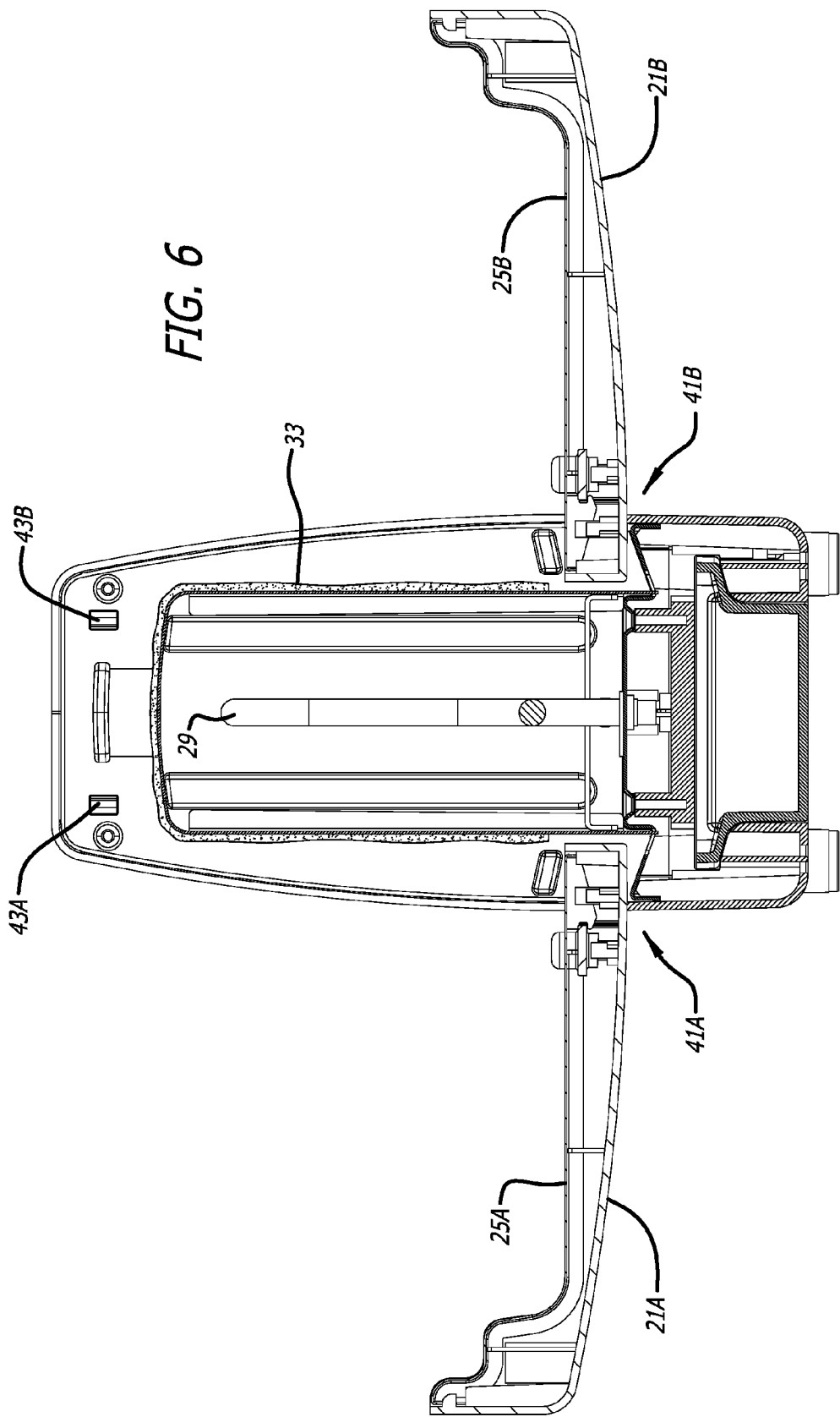
FIG. 6 is a cross-section of the invented grilling apparatus showing the two doors in an open position.

FIG. 6 shows the invented grilling apparatus with doors 21A and 21B in an open position. Also shown are biasing hinge springs 41A and 41B inside doors 21A and 21B respectively which operate to bias doors 21A and 21B in the open position. Doors 21A and 21B can be manually closed and are maintained in the closed position by engaging latches 43a and 43B formed on an inner surface of sides 15A and 15B. In one embodiment, When buttons 19a and 19b (not shown in FIG. 6) are depressed, doors 21A and 21B are released from latches 43a and 43B, which enables biasing hinge springs 41A and 41B to move doors 21A and 21B from the closed position to the open position. In this regard, a number of well known mechanisms can be used for the buttons, latches and biasing springs for the above described purpose, and the specifics of such mechanisms are not important for a proper understanding of the invention. In another embodiment, rather than buttons, latches and springs, the doors are provided with handles (not shown) which are used to open and close the doors by simply pulling on the handles in a down direction to open the doors and in an up direction to close the doors.

FIG. 7 shows the invented grilling apparatus in cross section showing the doors 21A and 21B in a closed position with bacon strips 33 between grill door plates 25A and 25B and grill 27. Although grill door plates 25A and 25B get hot as described above, there is an air space 45 between the doors and the grill plates which acts as an insulator which prevents the outside surface of doors 21A and 21B from getting hot. As the bacon strips cook, grease from the bacon strips follows a path shown by arrows 47 into grease tray 23.

Accordingly, a grilling apparatus has been described with reference to the attached drawings. Although the present invention has been described in considerable detail with reference to a specific embodiment thereof, other embodiments are possible. Therefore, the spirit and scope of the appended claims should not be limited to the description of the specific embodiments contained herein.

We claim:

1. A grilling apparatus comprising:
   a) a base;
   b) sidewalls extending from opposite ends of the base;
   c) a pair of doors, each coupled to opposite sides of the base and movable from an open position to a closed position, wherein in said open position, said doors lie in a plane which is substantially perpendicular to a corresponding plane passing through each side of the base, and in said closed position, said doors lie in a plane which is substantially the same as the corresponding plane passing through each side of the base;
   d) a pair of grill plates, each removably coupled to a corresponding one of said doors;
   e) a heating element extending from said base and between said side walls;
   f) a removable grill disposed over said heating element between said side walls;
   wherein when said doors are in said closed position, said grill and said grill plates are within an enclosed space, and when power is supplied to said heating element, heat generated by said heating element is provided by convection to said grill and said grill plates,
   wherein said grill includes handles at each side thereof, said handles for lifting said grill above said base and said side walls.

2. The grilling apparatus defined by claim 1 further comprising spring hinges which couple said doors to said base, said spring hinges configured to bias said doors in a normally open position and a latch disposed within said sidewalls configured to hold said doors in said closed position against a force provided by said spring hinges to hold said doors in said normally open position.

3. The grilling apparatus defined by claim 2 further comprising buttons disposed on a top side of each of said sidewalls, wherein depressing said buttons causes said latches to release said doors, said spring hinges operating to move said doors from said closed position to said open position.

4. A grilling apparatus comprising:
   a) a base;
   b) sidewalls extending from opposite ends of the base;
   c) a pair of doors, each coupled to opposite sides of the base and movable from an open position to a closed position, wherein in said open position, said doors lie in a plane which is substantially perpendicular to a corresponding plane passing through each side of the base, and in said closed position, said doors lie in a plane which is substantially the same as the corresponding plane passing through each side of the base;
   d) a pair of grill plates, each removably coupled to a corresponding one of said doors;
   e) a heating element extending from said base and between said side walls;
   f) a removable grill disposed over said heating element between said side walls;
   wherein when said doors are in said closed position, said grill and said grill plates are within an enclosed space, and when power is supplied to said heating element, heat generated by said heating element is provided by convection to said grill and said grill plates,
further comprising a locking mechanism disposed on side edges of said doors and side edges of said grill plates, said locking mechanism configured to releasably lock each of said grill plates to a corresponding one of said doors.

* * * * *